United States Patent [19]
Kinsinger et al.

[11] 3,874,772
[45] Apr. 1, 1975

[54] ADJUSTMENT MECHANISM FOR A LENS AND PRISM MOUNTED WITHIN A FILM VIEWER

[75] Inventors: William C. Kinsinger, New York; James Ippolito, Bronx; Vincent Pisarri, Scarsdale, all of N.Y.

[73] Assignee: Metagraphic Systems, Inc., Bronx, N.Y.

[22] Filed: Sept. 24, 1973

[21] Appl. No.: 400,176

Related U.S. Application Data
[60] Division of Ser. No. 96,415, Dec. 9, 1970, Pat. No. 3,762,810, which is a continuation-in-part of Ser. No. 884,260, Dec. 11, 1969, Pat. No. 3,672,756.

[52] U.S. Cl. ................... 350/247, 350/41, 350/77, 350/255, 350/287
[51] Int. Cl. ............................................. G02b 7/02
[58] Field of Search ............ 353/39, 101; 350/8, 19, 350/21, 22, 26, 40, 41, 44, 46, 47, 77, 81, 82, 84, 114, 115, 245, 247, 255, 286, 287, 301

[56] References Cited
UNITED STATES PATENTS
| | | | |
|---|---|---|---|
| 1,766,102 | 6/1930 | Brenkert et al. | 353/101 |
| 1,935,113 | 11/1933 | Crawford | 350/287 |
| 2,976,762 | 3/1961 | Imshaug | 350/247 |
| 3,093,029 | 6/1963 | Johannsen | 353/101 |

*Primary Examiner*—Ronald L. Wibert
*Assistant Examiner*—Michael J. Tokar
*Attorney, Agent, or Firm*—Lerner, David, Littenberg & Samuel

[57] ABSTRACT

A film viewer is disclosed which includes a base; a multifunction support member secured to the base, with the support member having an aperture therethrough; first means removably secured to the support member for supporting and dispensing roll film mounted thereon; second means removably secured to the support member for taking up the roll film dispensed by the first means; a lens system removably secured to the support member intermediate the first and second means and over the aperture of the support member; a light system for causing light to be passed through the aperture toward the lens system; novel rolll film guide means and retaining means therefor removably supported by the support member for guiding roll film advancing between the first and second means in a path of travel over the aperture in the support member; and motive means removably secured to the support member for operating the first and second means. In addition to the above functions, the support member further functions to align all components and to slidably support a plate film carriage by which the film viewer can be used for viewing microfilm in either card or plate formats. The base supports and aligns a generally U-shaped frame of the viewer which in turn removably carries the front and rear cover sections of the viewer with a reflecting module therebetween. In addition, the base supports the afroementioned light system which in of itself is provided with a novel heat sink construction.

6 Claims, 12 Drawing Figures

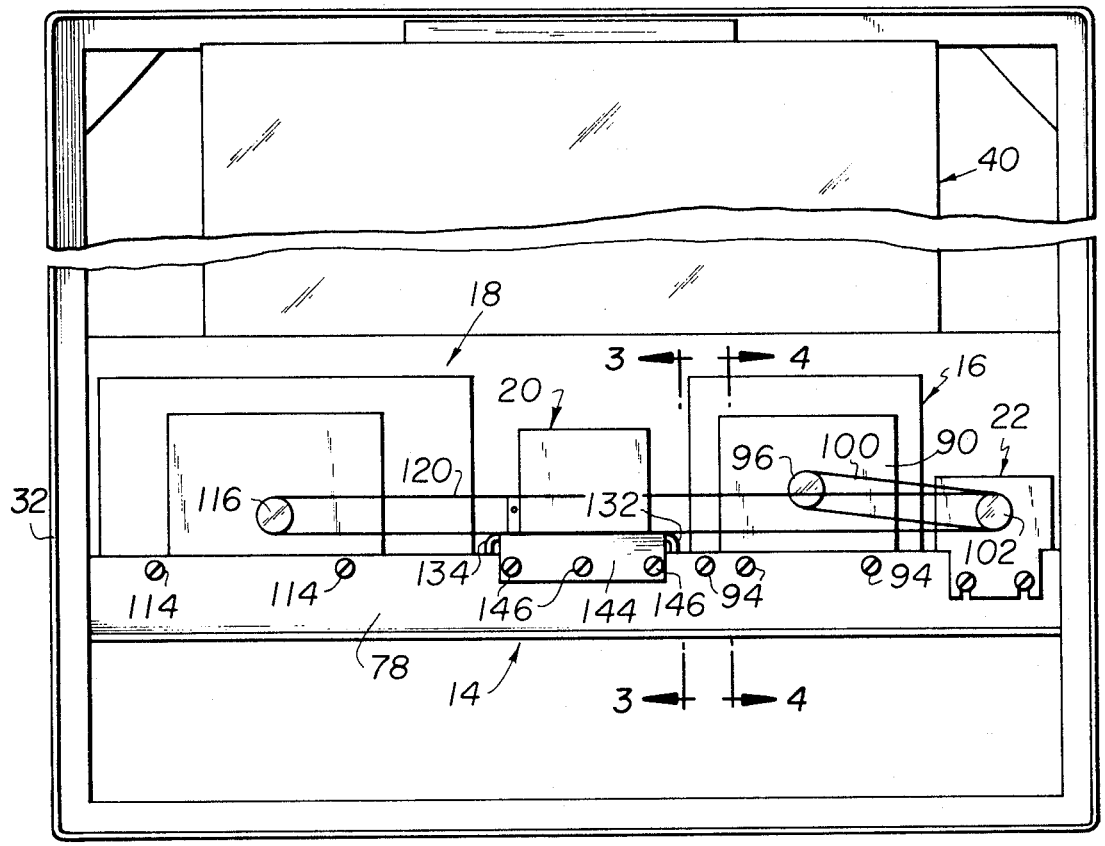
FIG. 2
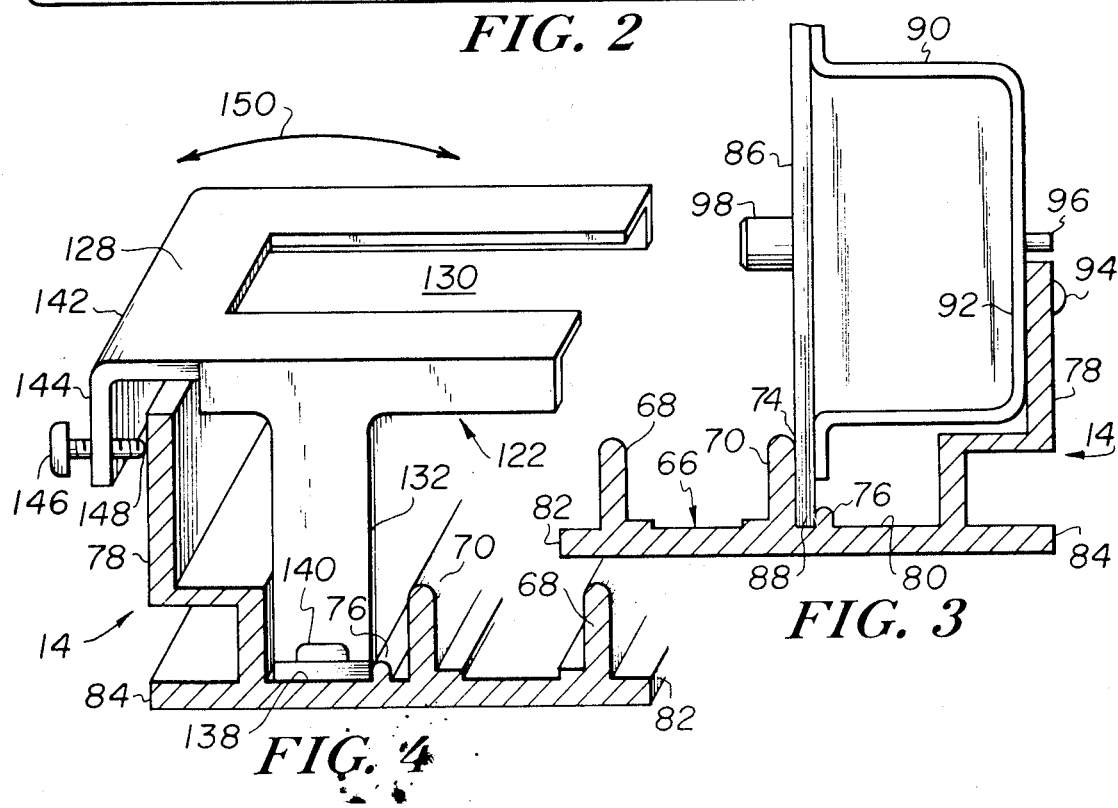
FIG. 3
FIG. 4

ADJUSTMENT MECHANISM FOR A LENS AND PRISM MOUNTED WITHIN A FILM VIEWER

CROSS REFERENCE TO RELATED APPLICATION

This application is a division of application Ser. No. 96,415 filed Dec. 9, 1970 and now U.S. Pat. No. 3,762,810 which was a continuation-in-part of application Ser. No. 884,260 filed Dec. 11, 1969 and now U.S. Pat. No. 3,672,756.

FIELD OF THE INVENTION

This invention relates to film viewers, particularly of the type adapted to view film in various formats, and more particularly to such a film viewer which is of modular construction thereby facilitating economical manufacture and simple servicing.

BACKGROUND OF THE INVENTION

In U.S. Pat. Application Ser. No. 884,260, there is disclosed a film viewer capable of viewing film in a number of film formats such as microfilm in roll form, microfilm in fiche form, and microfilm in card form. As well known in the art, microfilm in roll form comprises a continuous strip of film rolled on a reel and containing sequentially spaced film images or frames. Microfilm in card form generally comprises film including one or more images mounted on a card for ease of handling and storage. Microfilm in fiche form, commonly referred to as microfiche, generally comprises a rectangular sheet of film containing a plurality of film images arranged in rows and columns. As set fourth in the aforementioned application, it is extremely desirable to produce a film viewer which can interchangeably handle the various microfilm formats discussed above. To that end, the invention set forth in the Kinsinger application permits the use of a single viewer capable of viewing microfilm in roll form or microfilm in fiche or card form.

SUMMARY OF THE INVENTION

It is the purpose of the present invention to provide a film viewer generally similar to that disclosed in the aforementioned Kinsinger application, but which is extremely simple and economical to manufacture, simple to assemble, and extremely simple to service by even relatively unskilled personnel. Like the viewer of the Kinsinger application, the viewer hereof is primarily intended to be used with film of various formats, but if desired, the principals of the invention can be employed to construct a viewer intended to view film in a single film format.

Briefly stated, the viewer of the instant invention includes a base, a multifunction support member secured to the base with the support member having an aperture therethrough; first means secured to the support member for supporting and dispensing roll film mounted thereon; second means secured to the support member for taking up roll film dispensed by the first means; a lens system secured to the support member intermediate the first and second means and over the aperture; a light system for causing light to be passed through the aperture and toward the lens system; roll film guide means supported by the support member for guiding the roll film between the first and second means in a path of travel over the aperture; and motive means for separating the first and second means.

From the above, it is to be appreciated and in fact considered to be one of the features of the instant invention that the aforementioned support member is indeed multifunction in the sense that it supports and aligns the following self-contained modular-like components: the first means for dispensing roll film, the second means for taking up the roll film, the lens system, and the roll film guide means. Additionally, in a preferred embodiment of the instant invention the same support member which performs the above described functions additionally functions to support the aforementioned motive means; and, if the invention is employed as a viewer for films of various formats, the support member also slidably carries the plate film carriage which carries the film in such other formats.

As a particularly advantageous feature of the invention, such multifunction support member removably supports all of the above described components in a most simple manner and by which subsequent servicing can be performed by unskilled personnel. In a preferred form, such support member includes a plurality of upstanding ribs two of which function to define a retaining channel for the aforementioned modular-like components, while two of such ribs additionally function to define a roll film track means which receives the aforementioned guide means. Finally, such support member includes a upstanding retaining wall which, together with the aforedescribed retaining channel, provides the simple means by which all of the various components can be most easily secured to and removed from the support member.

As a further feature of the instant invention, the base of the film viewer of the invention is provided with a novel slotted in-turned tongue construction which, in addition to performing the function of removably carrying the multi-function support member, also guidingly receives and retains a generally U-shaped frame member which in turn removably carries the front and rear cover sections of the viewer. The front section carries a screen by which the film images can be viewed. In addition, such base provides the supporting surface for the light system which in of itself is provided with a novel heat sink construction.

As a further feature, the aforementioned lens system of the invention is constructed in a simple and expeditious manner by which the primary lens and prism associated therewith can be easily moved with the necessary degrees of freedom sufficient to cover the various film formats which may be employed.

As a further particularly advantageous feature of the invention, there is provided a roll film guide means employing rollers the peripheries of which maintain the film guiding edges of such member at a predetermined distance above the roll film passing therebeneath.

Accordingly, it is an object of the present invention to provide a simple, inexpensive, easy to manufacture, easy to service film viewer intended for viewing films in various formats or if desired, for viewing films in only a single format.

It is another object of the invention to provide such a film viewer which employs a multifunction support member on which various modular-like components of the viewer can be simply, easily, and properly aligned and from which such components can be easily removed for service and/or replacement.

Yet another object of the instant invention is to provide such a film viewer which includes a simple and effective base structure which functions to carry the aforementioned support member; receive, retain and support the frame of the viewer; and support the light system associated with the viewer.

Still another object of the instant invention is to provide a particularly efficient light system employing novel heat dissipating structures.

Another object of the instant invention is to provide a lens system employing such construction as to permit ready movement with various degrees of freedom.

Yet another object of the instant invention is to provide a film guide member provided with a novel roller construction which permits film guiding edges associated with such guiding member to be uniformly spaced from roll film passing therebeneath regardless of the thickness of the roll film employed. Additionally, and as will be described in greater detail, a retaining means removably secured to the multifunction support member is provided to properly restrain the aforementioned film guide means from certain movements while at the same time allow such film guiding means to experience a preselected amount of vertical motion.

Other objects of the instant invention as well as a better understanding thereof may be had by referring to the following drawings in which:

FIG. 2 is a rear view of the viewer of the instant invention with the rear cover section thereof removed;

FIG. 3 is a side view partially in section of a portion of the apparatus of the instant invention;

FIG. 4 is a side view partly in section of another portion of the instant invention;

Figure 1:
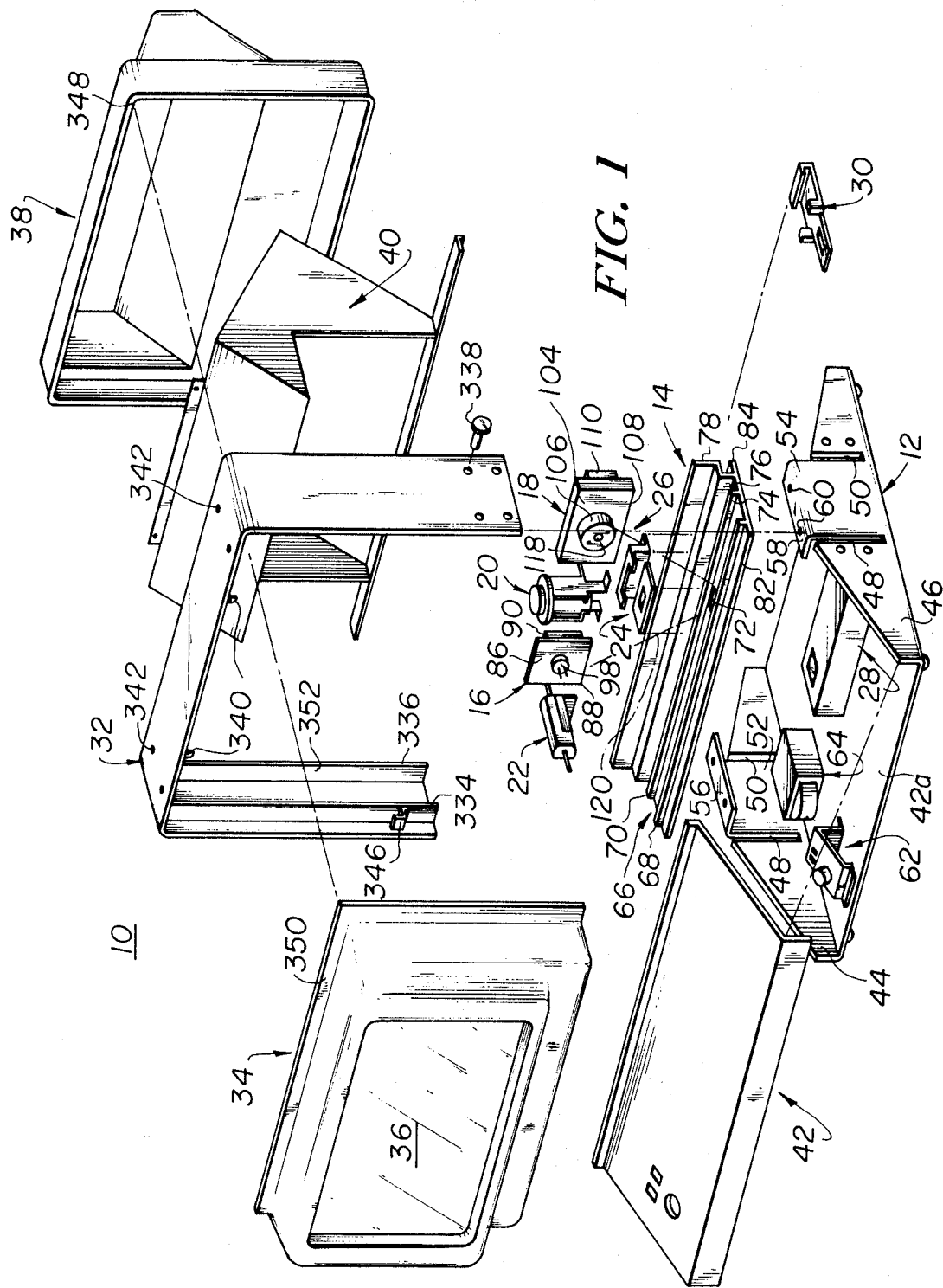
FIG. 1 is an exploded perspective view of the film viewer of the instant invention.

Turning to the Figures wherein like numbers are used to designate like elements, and with specific reference to FIG. 1, there is shown the film viewer 10 of the instant invention. Broadly speaking, and as will be described in greater detail, the film viewer 10 includes the following components:

A base 12; a multifunction support member 14 removably secured to the base 12; first means 16 removably secured to the support member 14 for supporting and dispensing roll film mounted thereon; second means 18 removably secured to the support member 14 for taking up the roll film dispensed by the first means; a lens system 20 removably secured to the support member 14 intermediate the first means 16 and the second means 18; motive means 22 removably secured to the support member 14 for selectively operating the first means 16 and the second means 18; roll guide means 24 supported by the support member 14 for guiding the roll film advancing between the first means 16 and the second means 18 in a path of travel over an aperture (72 shown in FIG. 1) in the support member 14; roll film guide retaining means 26 for restraining the roll film guide means 24 to preselected degrees of movement; a light system 28 supported on the base 12 beneath the support member 14; and, if the viewer 10 is to be employed for viewing film in more than one format, a plate film carriage 30 slidably supported on the support member 14 for selective placement of film in plate form under the aforementioned aperture in the support member 14.

In addition, the film viewer 10 includes a generally U-shaped frame 32 removably secured to the base 12; a front cover section 34 removably secured to the U-shaped frame member 32, with the front cover section 34 containing a viewing screen 36 therein; a rear cover section 38 removably secured to the opposite side of the U-shaped frame member 32; a reflective module 40 secured to the U-shaped frame member 32 for reflecting light received from the lens system 20 forward toward the screen 36; a front cover panel 42 removably secured to the base 12 and a similar rear cover panel (not shown) removably secured to the base 12.

Before going into detail as to the nature of each of the above described components, it should first be appreciated from the brief description thus far presented, that the viewer 10 is of simple, economical construction since it involves the assembly of a plurality of modular-like components easily connectable to and removable from one another with the simplest of tools and by even the most unskilled personnel. Moreover, it should be further appreciated, especially from the exploded perspective view of FIG. 1, that the viewer 10 of the instant invention can be easily serviced since each of the various modular-like components can be easily removed from the overall viewer for repair or replacement.

Turning now to a more detailed description of the viewer, the base 12 includes a planar surface 42 having a pair of upstanding side walls 44 and 46 disposed along opposite longitudinal edges thereof. The side walls 44 and 46 include elongated slots 48 and 50 which thereby define tongue sections 52 and 54 therebetween. Each of the tongue sections 52 and 54 terminate in in-turned flange portions 56 and 58 to which the multifunction support member 14 is removably secured by appropriate fastening means (not shown) passing through the support member 14 and into apertures 60 provided in the flange portions 56 and 58 respectively.

As noted previously, the planar surface 42 of the base 12 carries the light system 28 and additionally supports control switches broadly designated 62 and a transformer 64 neither of which concern the instant invention. By appropriate fastening means, the front cover 42 and the rear cover (not shown) are secured to the side walls 44 and 46 of the base 12 to "hide" the internal portions thereof.

As best seen in FIGS. 1, 3, 4, and 10, the multifunction support member 14 (preferably of extruded aluminum) comprises an elongated horizontally disposed, generally planar member having certain surface irregularities the nature and function of which will now be explained in greater detail. Specifically, the support member 14 includes roll film track means broadly designated 66 which guidingly receives the aforementioned roll film guide means 24 in a manner to be further described. Such roll film track means 66 is defined by a pair of upstanding ribs 68, 70 longitudinally extending the length of the support member 14 on opposite sides of the aforementioned aperture 72 best seen in FIGS. 10 and 11. The detailed construction of the roll film track means 66 will be further described in connection with the description of the roll film guide means 24 and the roll film guide retaining means 26 illustrated in FIGS. 10 and 11.

The support member 14 further includes a retaining channel 74 defined by the longitudinally extending rib 70 and a third upstanding rib 76 (somewhat shorter than the ribs 68 and 70) laterally displaced from the rib 70 and extending parallel thereto. As will be explained in greater detail with respect to FIG. 3, the retaining channel 74 cooperates with an upstanding retaining wall 78 to removably support the first means 16 (for dispensing roll film) and the second means 18 (for taking up roll film) on the support member 14.

The support member 14 further includes an elongated planar portion 80 disposed between the rib 76 and the upstanding wall 78. The portion 80 together with the upstanding wall 78, functions to removably support the lens system 20 on the support member 14. Finally, the support member 14 includes front and rear retaining edges 82 and 84 upon which the aforementioned carriage means 30 is slidably supported (in the manner described in detail in the aforementioned Kinsinger application) should it be desirable to utilize the viewer 10 with films of various formats.

Turning to FIG. 3, there is illustrated in greater detail the manner in which the first means 16 for supporting and dispensing roll film and the second means 18 for taking up roll film dispensed by the first means are removably supported with respect to the support member 14. Since the first means 16 and the second means 18 are generally similar in their external configuration and in the manner in which they are removably supported with respect to the support member 14, it will be understood that the description provided with respect to FIG. 3 is applicable to both the first means and the second means 18.

Specifically, and with reference for the moment to FIG. 1, the first means 16 includes a planar support wall 86 for providing a backing surface for a roll film cartridge (not shown) supported thereon. The planar support wall 86 includes a lower longitudinal edge 88 (also shown in FIG. 3) which is removably received in the aforedescribed retaining channel 74. Additionally, the first means 16 includes a gear housing 90 secured to the rear surface of the planar support wall 86, with the gear housing 90 having a rear wall 92 which is removably secured to the upstanding retaining wall 78 of the support member 14 by appropriate fastening means 94 shown in FIGS. 2 and 3.

It will be understood, that gear housing 90 contains the necessary gearing (not shown) for properly interconnecting a shaft 96 extending through the rear surface 92 of the gear housing 90 and a shaft 98 extending through the planar support wall 86 of the first means 16. Thus and as well known in the art, with the aid of a pulley 100 (FIG. 2) interconnecting the output shaft 102 of the motive means 22 with the shaft 96 of the first means 16, it is possible to dispense film from a self-contained film cartridge (not shown) suitably positioned on the shaft 98 and supported by the planar support wall 86. Since such film dispensing from self-contained cartridges forms no part of the instant invention and in fact is well known in the art, further description thereof will not be presented herein.

Like the first means 16, the second means 18 includes a planar support wall 104 for providing a backing surface for a roll film take up reel 106 supported thereon. With reference to FIG. 3, like the planar support wall 86 of the first means 16, the planar support wall 104 of the second means 18 includes a lower longitudinal edge 108 which is removably received by the aforedescribed retaining channel 74.

The second means 18 further includes a gear housing 110 secured to the rear of the planar support wall 104 with such gear housing having a rear wall 112 by which the gear housing 110 is removably connected to the upstanding retaining wall 78 of the support member 14 by appropriate fastening means 114 shown in FIGS. 2 and 3.

The gear housing 110 of the second means 18 includes appropriate gearing (not shown) to interconnect a shaft 116 extending through the rear surface 112 of the gear housing 110 with a shaft 118 which extends forward of the planar support wall 104 of the second means 18. As best seen in FIG. 1, the shaft 118 supports the aforementioned take up spool 106.

As best seen in FIG. 2, a pulley 120 interconnects the output shaft 102 of the motive means 22 with the shaft 116 whereby the take up spool 106 can be rotated to take up film being dispensed in the aforementioned manner by the first means 16. Again, since such operation is well known in the art, and forms no part of the instant invention, further description thereof will not be presented. For the purposes of the instant invention, it is sufficient to note at this point, that when film is dispensed from a cartridge (not shown) activated by the first means 16 and is taken up by the second means 18, such roll film will traverse a path shown by the phantom line 120 in FIG. 1 which causes the roll film to pass over the aperture 72 most clearly shown in FIGS. 10 and 11) and under the lens system 20. As will be explained with respect to FIG. 9 through 11, such path of travel is established by the roll film guide means 24 (suitably retained by the roll film guide retaining means 26) in conjunction with the roll film track means 66.

Returning to a consideration of FIG. 3, from the description thus far presented, it will be appreciated that the support member 14 performs two important functions in its association with the first means 16 and the second means 18. First, retaining channel 74 together with the retaining wall 78 function to removably support both the first means 16 and the second means 18 with respect to the support member 14 and with respect to the entire viewer 10. Thus considering FIG. 2, a rear view of the viewer 10 with a rear cover section 38 removed, it will be seen that by simply removing the fastening screws 94 and 114, one can easily remove for repair or replacement the entire dispensing means 16 and/or take up means 18. Secondly, the common cooperation of the first means 16 and the second means 18 with the same retaining channel 74 and the retaining wall 78 guarantees that such modules will be properly aligned with respect to one another and with respect to all other components of the viewer.

Figure 5:
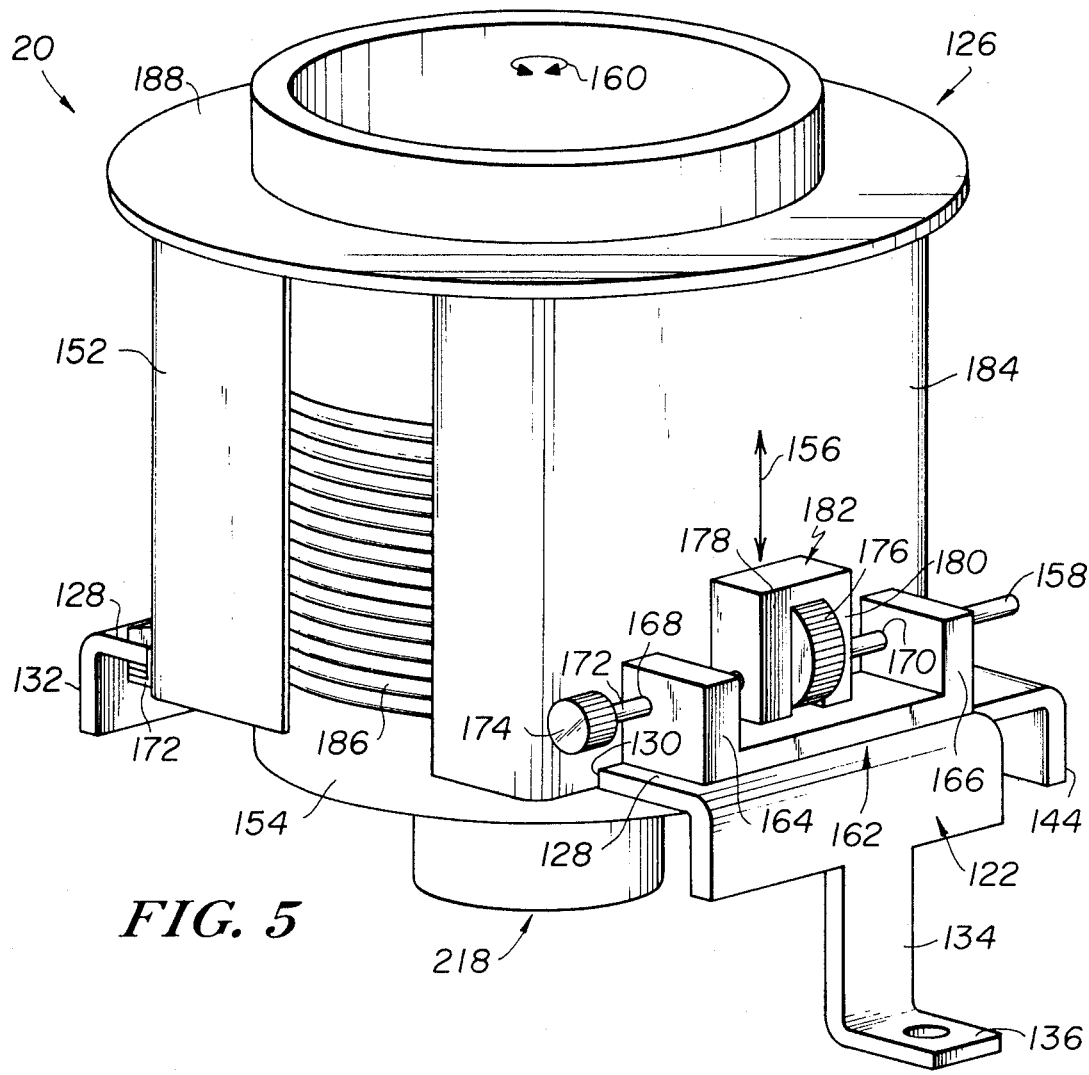
FIG. 5 is an enlarged perspective view of the lens system of the instant invention.

Turning to FIGS. 4 through 8, the lens system 20 of the instant invention includes a support bracket 122, prism 124 (FIG. 7) and prism supporting means broadly designated 126 in FIG. 5. As best seen in FIG. 4, the support bracket 122 includes an upper planar surface 128 having a rather wide elongated slot 130 which receives the prism supporting means 126 in a manner to be further described. Depending from opposite edges of the planar surface 128 are a pair of legs 132, 134 which terminate in out-turned seating tabs 136, 138 removably secured by appropriate fastening means 140 (FIG. 4) for the aforementioned portion 80 of the multifunction support member 14.

Extending downwardly from the rearward edge 142 of the planar surface 128 of the support bracket 122 is a rear portion 144 of the bracket 122 which extends over and generally parallel to the retaining wall 78 of the support member 14 when the lens system 20 is removably secured to the support member 14. Passing through the rear portion 144 of the support bracket 122 and in screw threaded relationship therewith, are a plurality of adjusting screws 146 the inner ends 148 of which come into abutting contact with the upstanding retaining wall 78 of the support member 14. It will be appreciated that by rotating the adjusting screws 146 such as to effect inward or outward movement of the rearward wall portion 144 of the bracket 122 with respect to the retaining wall 78 of the support member 14, it is possible to vary and therefore adjust the angular positioning of the entire lens system 20 with respect to the support member 14. Such angular adjustment capability is represented in FIG. 4 by the two way arrow 150.

Figure 7:
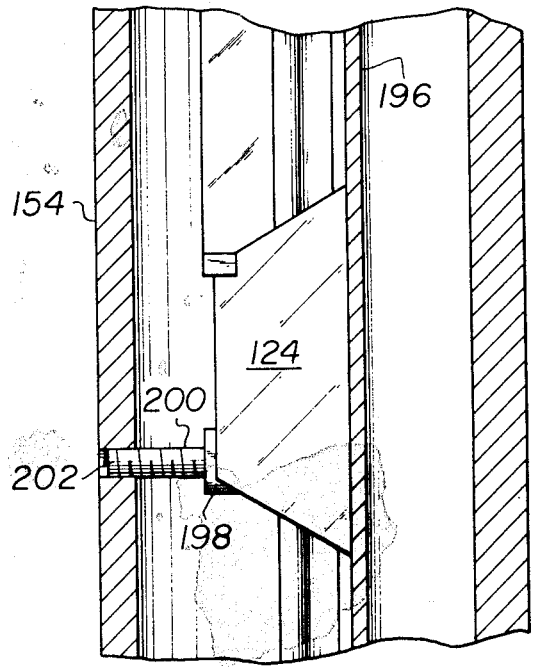
FIG. 7 is a sectional view of a portion of the apparatus shown in FIG. 5.

Turning to FIG. 5, the prism supporting means broadly designated 126 includes a barrel retaining means 152 and the barrel 154 which carries the aforementioned prism 124 in a manner which will be further described with respect to FIG. 7. The prism supporting means 126 comprising the barrel retaining means 152 and the barrel 154 all cooperate with one another and the bracket 122 to permit selective vertical and transverse movement of the prism with respect to the support member 14 (as represented by the arrows 156 and 158 respectively in FIG. 5) and also to permit selected rotational movement of the prism with respect to an axis perpendicular to the plane of the support member 14 (as represented by the arrow 160 in FIG. 5). As will be appreciated, such movements are desirable in order to properly focus and position the lens system with respect to film positioned therebeneath.

Specifically, secured to the planar surface 128 of the support bracket 122 and upstanding therefrom is a generally U-shaped or bifurcated member 162 the legs 164 and 166 of which are provided with apertures 168 and 170 respectively which freely support for both longitudinal and rotational motion an adjustment shaft 172 having an operating knob 174 secured at one end thereof. Fixedly secured on the shaft 172 is a gear 176 which is sandwiched between the legs 178 and 180 of a generally inverted U-shaped member 182 secured to one wall 184 of the generally retangular (in cross section) barrel retaining member 152. It should be pointed out that the wall 184 contains an elongated opening or window (not shown in FIG. 5) by which the peripheral teeth of the gear 176 pass through the wall 184 and into engagement with rings 186 provided on the exterior of the generally cylindrical barrel 154. Also, the barrel 154 is provided with an enlarged ring portion 188 at its upper end thereof by which the user can easily rotate the barrel 154 with respect to the barrel retaining means 152.

Figure 6:
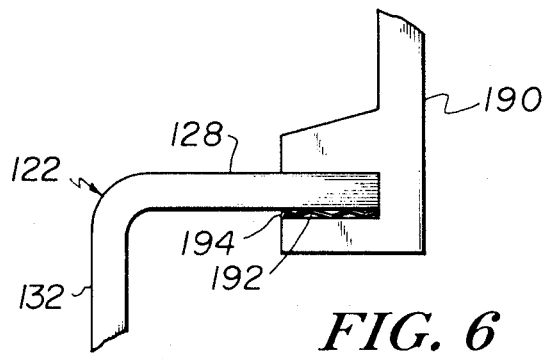
FIG. 6 is an enlarged view of a portion of the apparatus shown in FIG. 5.

Should one wish to move the prism 124 carried by the barrel 154 in a transverse direction represented by the double headed arrow 158, he simply grasps the knob 174 of the shaft 172 and either pushes or pulls the shaft in the direction desired. Since the gear 176 is rigidly secured to the shaft 172 and furthermore, since such gear is sandwiched in the member 182 fixed to the wall 184 of the barrel retaining means 152, the pushing or pulling of the shaft 172 will effect transverse movement of the shaft 172, the gear 176, the member 182, the retaining means 152, the barrel 154 carried thereby and the prism 124 located within the barrow 154. It might be pointed out, and as illustrated in FIG. 6, that the opposite wall 190 of the barrel retaining means 152 is provided with a channel 192 which slidingly receives the upper planar surface 128 of the support bracket 122. Preferably, a frictional element 194 in the form of an elongated bent spring leaf type member is inserted in the channel 192 to provide a predetermined amount of resistance to the sliding motion of the barrow retaining means 152 with respect to the support bracket 122 to facilitate transverse positioning of the lens system with respect to the support member 14.

To adjust the vertical position of the prism 124 with respect to the support member 14, the knob 174 is rotated which in turn rotates the gear 176 the peripheral teeth of which (passing through the window in the wall 184) cooperate with the rings 186 provided on the barrow 154 to either raise or lower the barrow 154 with respect to the support member 14. Finally, to rotate the entire prism 124 with respect to an axis perpendicular to the support member 14, one simply grasps the enlarged ring 188 and rotates the entire barrel in the direction represented by the double headed arrow 160. It will be appreciated that since the rings 186 are individually continuous about the circumference of the barrel 154 (and not spirally related to the barrel 154), one can rotate the barrel 154 without raising or lowering such barrel with respect to the support member 14.

Figure 8:
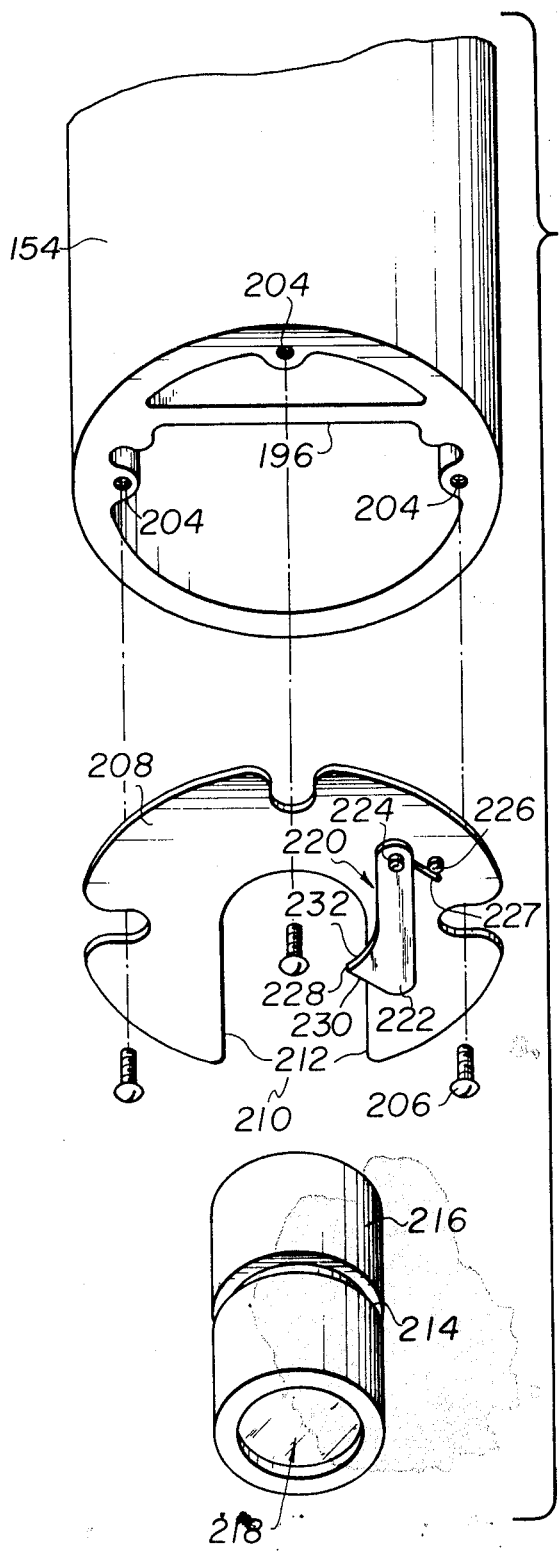
FIG. 8 is an enlarged exploded perspective view of a portion of the apparatus shown in FIG. 5.

Turning to FIGS. 7 and 8, it will be seen that the barrel 154, preferably of extruded aluminum, contains an internal wall 196 against which prism 124 is removably retained by a generally L-shaped bracket 198 carried on one end of a screw threaded stem 200 threadably received in an aperture provided in the wall of the barrel 154. Thus should the prism 124 require replacement, one simply inserts a screw driver in the slotted end 202 of the stem 200, rotates same, and allows the prism 124 to be removed from the bottom of the barrel 154.

As best shown in FIG. 8, the bottom of the barrel 154 includes a plurality of tapped openings 204 which receive appropriate fastening means 206 to removably secure a primary lens support plate 208 to the bottom of the barrel 154. The plate 208 has an elongated knotch 210 therein the edges 212 of which guidingly support and are received by a circumfrential slot or channel 214 provided in the exterior casing 216 on a primary lens system broadly designated 218 in FIGS. 5 and 8. The support plate 208 further includes spring biased retention means 220 for permiting the primary lens sub-system 218 to be easily removed from or retained by the support plate 208.

Specifically, the retention means 220 includes a somewhat J-shaped hook 222 mounted for rotational movement on the plate 208 about a pivotal axis 224. A spring element 226 (only one arm of which is shown in FIG. 8) cooperates with the hook 222 and a stop 226 to constantly bias the hook shape member 222 in a clockwise direction with respect to the axis 224. The tip 228 of the member 222 is defined by gradually slopping surfaces 230 and 232 whereby the primary lens sub-system 218 can rotate the member 222 against the bias of the spring 226 whenever it is desired to insert or remove the lens 218 from the rear of the knotch 210.

It will be appreciated that when the primary lens sub-system 218 is in its proper location at the rear of the slot 210 of the plate 208, such lens 218 is properly aligned with respect to the prism 124 positioned thereabove and moreover will necessarily experience the various degrees of movement (vertical, transverse and rotational) which were previously described with respect to the prism 124, the barrel 154, and the barrel retaining means 152.

Figure 9:
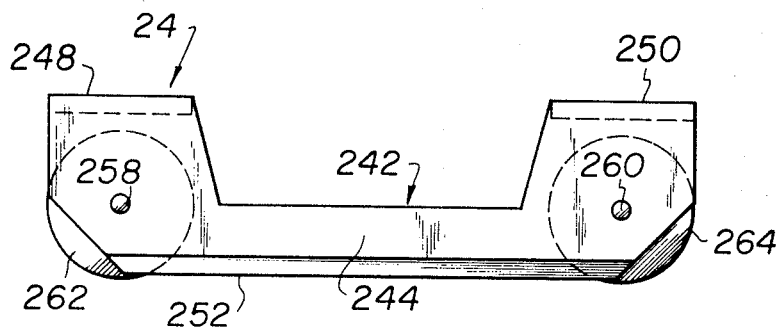
FIG. 9 is a front view of the film guiding means of the instant invention.
Figure 10:
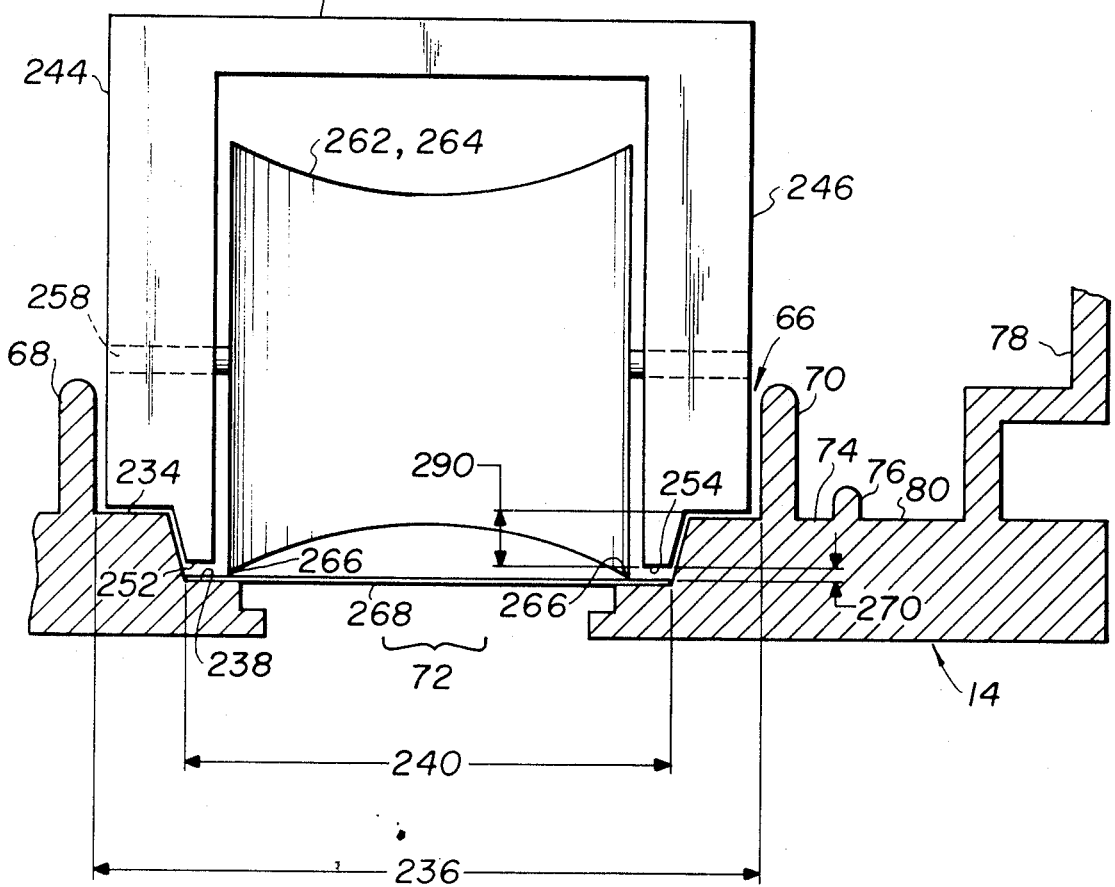
FIG. 10 is an enlarged view of the film guiding means of FIG. 9 and further showing the manner in which such film guiding means cooperates with a multifunction support member of the instant invention.
Figure 11:
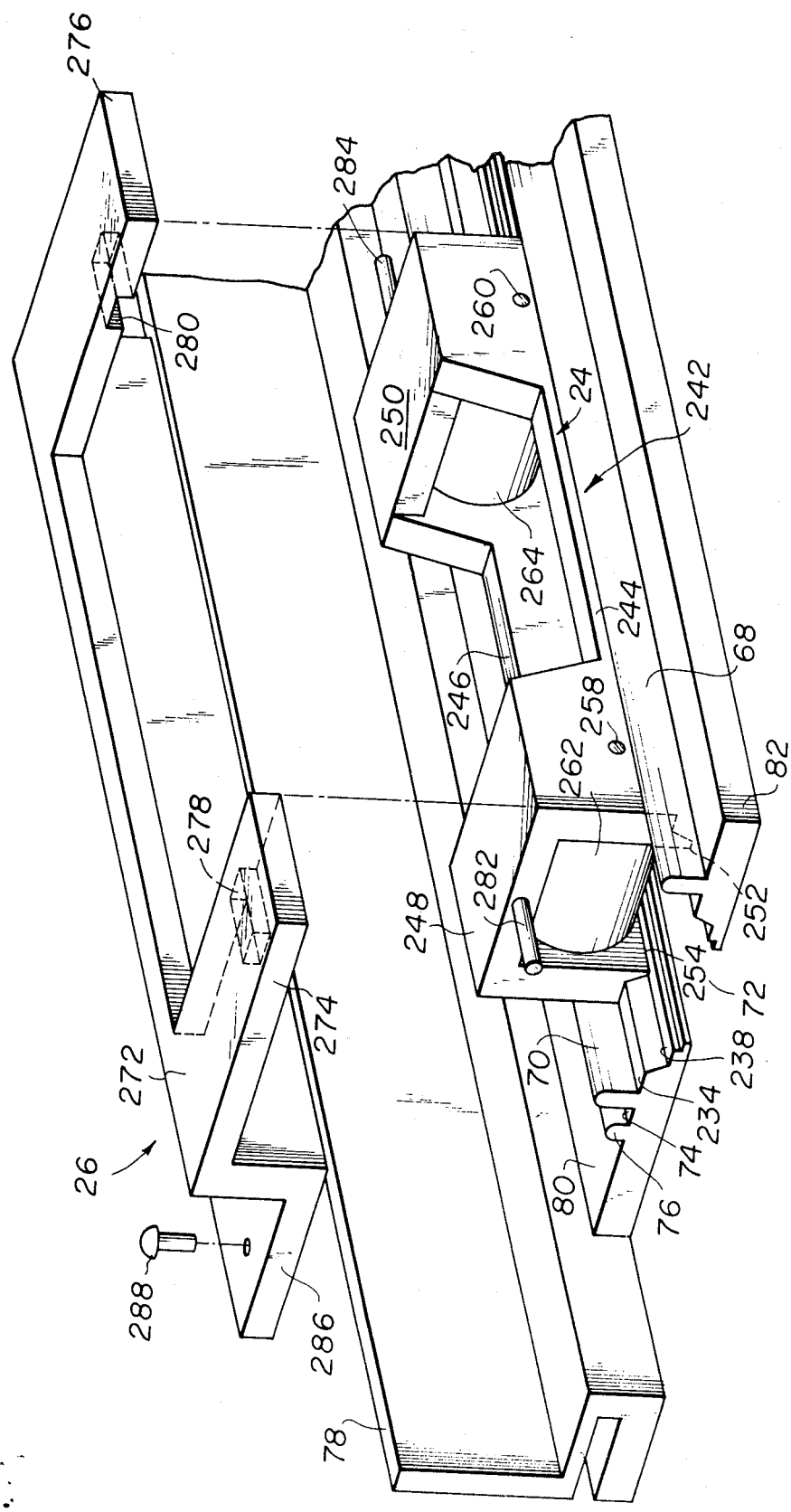
FIG. 11 is an exploded perspective view of the apparatus shown in FIG. 10 and further illustrates the film guide retaining means employed in conjunction therewith.

Turning to FIGS. 9 through 11, there is shown the details of the roll film guide means 24, the roll film guide retaining means 26, and the manner in which both members cooperate with the multifunction support member 14. Specifically, it will be seen perhaps most clearly in FIG. 10, that the roll film track means previously broadly designated by the character 66 actually includes a first track 234 having a width 236 established by the spacing between the pair of upstanding ribs 68 and 70, and a second track 238, of a width 240 less than the width 236, with the second track 238 being situated in a plane below the plane of the first track 234. As seen in FIG. 10, the film aperture 72 has a width less than the width 240 of the second track 238.

As best seen in FIGS. 9 and 11, the roll film guide means 24 includes a body member 242 comprising a pair of side walls 244 and 246 preferably integrally joined to one another by a pair of top walls 248 and 250. The side walls 244 and 246 include longitudinally extending depending film guiding edges 252 and 254 which are spaced apart by a distance greater than the width of the aperture 72 but less than the width 240 of the second track 238.

Each end of the thus defined slotted body member 242 further supports shafts 258 and 260 which rotatably carry rollers 262 and 264 respectively. As best seen in FIG. 10, the peripheral edges 266 of such rollers 262 and 264 extend below the aforementioned film guiding edges 252 and 254 which extend along the length of the side walls 244, 246 of the body member 242.

Thus, and regardless of the thickness of the film indicated at 268 in FIG. 10, there will always be a constant predetermined gap (indicated by the dimension 270 in FIG. 10) between the film guiding edges 252, 254 and the film itself. Moreover, this gap is critical since if the film guiding edges 252 and 254 were to touch the film, the frictional forces developed would impede the film movement, while at the same time if the gap is too large the film 268 would be free to buckle enough to cause focusing problems. In accordance with this aspect of the invention, the use of the rollers 262 and 264 extending below the film guiding edges 252 and 254 assures that the preselected gap will be maintained regardless of the film thickness, and such system is to be distinguished from the prior art in which different roll film guide members with film guiding edges of varying dimensions must be interchangeably used depending upon the thickness of the particular roll film being employed.

From the description thus far presented, it will be appreciated that as roll film passes beneath, and in fact engages the peripheral edges 266 of the rollers 262 and 264 of the film guide means 24; the guide means 24, if not properly restrained, would experience lateral motion in the direction of film travel. In the instant invention, roll film guide retaining means 26 cooperates with the roll film guide means 24 and prevents movement of the roll film guide means 24 in a lateral direction while at the same time, and for purposes to be further described, allows a predetermined amount of movement of the roll film guide means 24 in the vertical direction.

Specifically, retaining means 26 includes a generally U-shaped upper planar portion 272 the legs 274 and 276 of which include partial channelways 278 and 280 respectively which receive projections 282 and 284 extending in opposite direction from top walls 248 and 250 of the body member 242 of the guide means 24. It will be appreciated from the exploded view of FIG. 11, that such channelways 278 and 280 actually receive the projections 282 and 284 when the lower planar portion 286 of the generally z-shaped (in cross section) retaining member 26 is removably secured to the intermediate portion 80 of the support member 14 as by appropriate fastening means illustrated at 288 in FIG. 11. It should be noted that the lateral depths of the channelways 278 and 280 are such that the projections 282 and 284 are snugly received to thereby prevent lateral (side to side) motion of the guide member 24 as the film passes between the second track 238 of the roll film track means broadly designated 66 and the peripheral edges 266 of the rollers 262, 264 and the film guiding edges 252, 254.

Concerning the height or vertical dimension of the channelways 278 and 280 of the retaining means 26, it should be appreciated that normally microfilm in roll form includes an initial leader portion which is somewhat wider than the information bearing microfilm which follows the leader portion. In FIG. 10, the width of such leader portion of the microfilm is generally larger than the width of the second track 238 (having a width 240) but less than the width of the first track 234 (having a width 236). Accordingly, when the leader is first threaded under the guide member 24 (normally by well known self threading mechanism), the leader portion of the film rests on the first track 234 of the support member 14 and thereby causes the roll film guide means 24 to be lifted vertically by a distance corresponding to the dimension 290 in FIG. 10. Accordingly the vertical dimension of the channelways 278 and 280 of the retaining means 26 of FIG. 11 must be and is selected of sufficient height to allow the projections 282 and 284 to experience vertical movement within the channelways 278 and 280 at least as great as the dimension 290 in FIG. 10. From the above, it will be appreciated that the roll film guide retaining means 26 which is removably secured to the support member 14 prevents movement of the roll film guide means 24 in two directions (side to side) while allowing a predetermined amount of movement of the roll film guide means 24 in a third, vertical direction.

Figure 12:
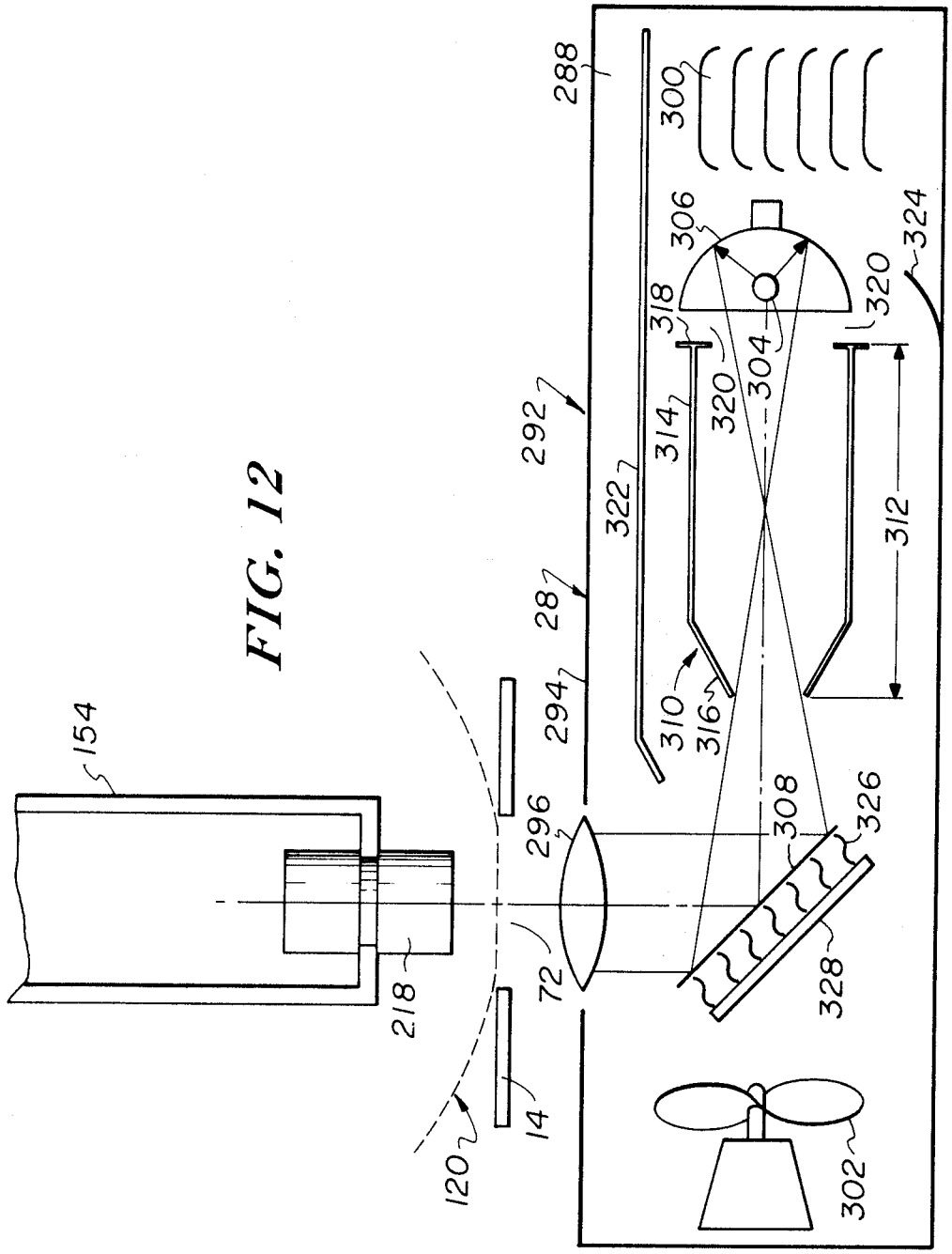
FIG. 12 is a side view of the light system of the instant invention;.

Turning to FIG. 12, the light system of the instant invention comprises a housing 292 having an upper surface 294 in which is positioned by appropriate means a condensing lens 296. Located in a side wall 298 of the housing, and at one end thereof, are air outlet openings 300 while positioned within the housing at the opposite end thereof is a fan broadly designated 302. The light system further includes a light source 304, a reflecting bowl 306, and a reflecting mirror 308 the purpose or which is to direct light from the light source up toward the condensing lens 296 whereby the light may pass through the film (in this case illustrated as microfilm in roll form following the path 120) to be magnified by the primary lens sub-system 218, appropriately directed by the prism 124 and reflected by the reflection module 40 (FIG. 1) to the screen 36.

The light system 28 further includes novel heat trap means broadly designated 310 positioned about a portion of the path of light (indicated by the dimension 312) for traping heat therein, whereby air heated by the light can be contained near the longitudinal center of the housing for effficient disposal thereof by air currents generated by the fan 302 in the manner to be presently described.

More specifically, the heat trap means includes a generally elongated cylinder 314 terminating in a frustroconical portion 316 at one end thereof. At the other end 318, the cylinder 314 is spaced from the reflective bowl 306 to create a venturi effect for the hot air traped in the heat trap means 310 when the fan 302 directs air current passed the space 320 between the end 318 of the cylinder 314 and the reflecting bowl 306. Thus hot air will be sucked out of the space 320 by the rushing air currents generated by the fan 302 and quickly disposed of through the openings 300 in the side wall 298 of the housing 292. Additionally, partitions 322 and 324 are positioned between the cylinder 314 and the wall of the housing 292 for directing air currents generated by the fan 302 passed the spaces 320 to help create the venturi effect and also for aiding in maintaining hot air close to the center of the housing 292. Finally, it should be noted that the reflecting plate 308 is constructed in a manner well known in the art to permit the passage of infrared light therethrough (represented by the arrows 326) while reflecting white light toward the condensing lens 296. In this connection another heat sink member 328 is disposed behind the reflecting plate 308 to help dissipate the infrared light.

Returning to FIG. 1, the frame 32 as noted, is generally U-shaped and preferably manufactured as an aluminium extrusion. The frame includes a pair of stiffening ribs 234 and 236 which are received by the slots 48 and 50 in the side walls 44 and 46 of the base 12 when the frame 32 is removably secured to the base 12 by appropriate fastening means illustrated at 338 passing through the apertures provided in the frame 32 into screw threaded engagement with the apertures provided in the side walls 44 and 46 of the base. Additionally, the frame 32 includes a pair of protuberances 340 positioned forward of the rib 334 and a similar pair of protuberances 342 positioned rearwardly of the second strengthening rib 336. Finally, the strengthening rib 334 carries a pair of clips 346 on the forward side thereof while the second rib 336 carries a similar pair of clips (not shown in FIG. 1) secured to the rearward facing side thereof.

As best seen in FIG. 1, the rear cover section 38 (preferably of molded plastic) includes a seating flange 348 which is slipped under the protuberances 342 and into the clips provided on the outward side of the second rib 336 when it is desired to removably secure the rear cover section 38 to the U-shaped frame 32. In similar fashion, the front cover section 34 includes an enlarged seating flange 350 which is slipped under the protuberances 340 and into the clips 346 provided on the first strengthening rib 334 when it is desirable to removably secure the front cover section 34 to the frame 32. Finally, it should be noted that the reflecting module 40 is secured by appropriate fastening means on the inside surface 352 of the second strengthening rib 336.

From the above, it will be appreciated that the instant invention provides a very simple, economical, modular like film viewer which can be easily constructed, and easily serviced with the simplest of tools by even the most unskilled personnel. If desired, the viewer can be employed to view microfilm in roll form alone or the carriage 30 described in detail in the aforementioned Kinsinger application may be employed in conjunction with the viewer of the instant invention to view film of various film formats.

Although this invention has been described with respect to its preferred embodiments, it should be understood that many variations and modifications will now be obvious to those skilled in the art, and it is preferred, therefore, that the scope of the invention be limited not by the specific disclosure herein, only by the appended claims.

We claim:

1. A lens system for use in conjunction with film disposed on a film supporting member; said lens system comprising:
   support bracket means for positioning said lens system with respect to said support member;
   a prism; and
   prism support means movably mounted with respect to said support bracket means for selective vertical and transverse movement of said prism with respect to said support member and for selective rotational movement of said prism with respect to an axis perpendicular to the plane of said support member.

2. The lens system of claim 1 wherein said prism supporting means includes:
   barrel retaining means mounted on said support bracket means for said transverse movement with respect to said support member; and
   a prism carrying barrel mounted on said support bracket means for said vertical and rotation movement with respect to said support member.

3. The lens system of claim 2 wherein said barrel has externally provided rings thereon; said barrel retaining means has an opening therethrough; and
   further including gear means rotatably mounted with respect to said support bracket means and extending through said opening and into engagement with said rings for effecting said vertical movement of said prism barrel.

4. The lens system of claim 3 wherein said gear means is secured to an adjustment shaft rotatably supported with respect to said support bracket means; and
   wherein said shaft is longitudingally fixed with respect to said barrel retaining means and longitudinally slidable with respect to said support bracket means; whereby said shaft can be slid in a transverse direction with respect to said support member to effectuate said transverse movement, and said shaft can be rotated to effectuate said vertical movement.

5. The lens system of claim 4 wherein said shaft is located on one side of said barrel retaining means; and further including friction means located on the opposite side of said barrel retaining means and cooperatively positioned with respect to barrel retaining means and said support bracket means for preselectively restricting the free sliding movement of said barrel retaining means with respect to said support bracket means.

6. The lens system of claim 2 wherein said lens system further includes a primary lens subsystem removably supported by said barrel beneath said prism; and
further including a primary lens subsystem support plate removably secured to the bottom of said barrel; said support plate having a notch therein to receive and support said primary lens sub-system and being provided with biased retention means for permitting said primary lens subsystem to be removed from or retained by support plate.

* * * * *